United States Patent [19]
Renth et al.

[11] 3,855,062
[45] Dec. 17, 1974

[54] PROCESS FOR PREPARATION OF DERIVATIVES OF L-TYROSINE

[75] Inventors: Ernst-Otto Renth; Kurt Schromm; Anton Mentrup, all of Ingelheim am Rhein, Germany

[73] Assignee: Boehringer Ingelheim GmbH, Ingelheim am Rhein, Germany

[22] Filed: July 19, 1972

[21] Appl. No.: 273,202

[30] Foreign Application Priority Data
July 22, 1971 Germany............................ 2136675
Jan. 3, 1972 Germany............................ 2200041
Apr. 1, 1972 Germany............................ 2216097

[52] U.S. Cl. ............................................... 195/2
[51] Int. Cl. ......................................... C12d 13/06
[58] Field of Search ................................ 195/29, 2

[56] References Cited
OTHER PUBLICATIONS
American Chemical Society Journal, N. Albertson, Vol. 73, No. 1, pages 452–454, 1951.
Journal of Biological Chemistry, Doherty and Popenoe, Vol. 189, No. 1, pages 447–460, 1951.

Primary Examiner—Lionel M. Shapiro
Assistant Examiner—Robert J. Warden
Attorney, Agent, or Firm—Hammond & Littell

[57] ABSTRACT
A process for the preparation of a derivative of L-tyrosine of the formula (L)

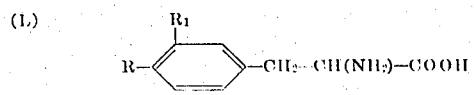

wherein
  R is hydrogen, hydroxyl or lower alkoxy, and
  $R_1$ is hydroxyl or lower alkoxy, provided, however, that at least one of R and $R_1$ is hydroxyl, which consists essentially of treating a derivative of DL-N-benzoyl-tyrosine of the formula (DL)

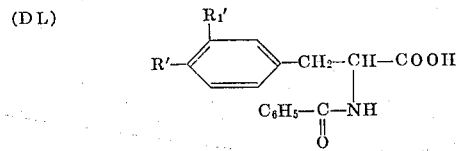

wherein
  R' is hydrogen, hydroxyl or lower alkoxy, and
  $R_1'$ is hydroxyl or lower alkoxy, with aniline or a ring-substituted aniline in a buffered aqueous solution having a pH of about 5 to 7 and in the presence of a protease which is effective within this pH range to form a correspondingly substituted L-N-benzoyl-m- or p-tyrosyl-anilide, and hydrolyzing said tyrosylanilide with a mineral acid of suitable strength.

3 Claims, No Drawings

PROCESS FOR PREPARATION OF DERIVATIVES OF L-TYROSINE

This invention relates to a novel process for the preparation of certain ring-substituted derivatives of L-tyrosine which produces significantly higher yields of the desired end products than the methods described in the literature.

BACKGROUND OF THE INVENTION

L-Tyrosine derivatives of the formula

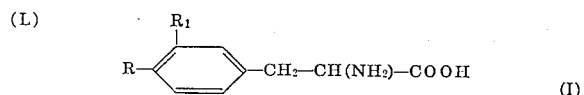

(I)

wherein
R is hydrogen, or lower alkoxy, and
$R_1$ is hydroxyl or lower alkoxy,
at least one of R and $R_1$ being hydroxyl, are known compounds which are useful for therapeutic treatment of Parkinson's disease.

These optically active compounds have heretofore been obtained by diastereoisomer separation of the corresponding racemates, as described in J.A.C.S. 73, 5386 (1957), and Helv. Chim. Acta 35, 1776 (1952). However, these methods have not produced satisfactory yields of the desired optically active end products.

OBJECTS OF THE INVENTION

It is an object of the present invention to provide a novel and improved method for the preparation of the known L-tyrosine derivatives of the formula I.

Another object of the present invention is to provide a process for the isolation of L-tyrosine dervatives of the formula I which produces significantly higher yields of the desired optically active end products than previous methods.

Still other objects and advantages of the invention will become apparent as the description thereof proceeds.

THE INVENTION

We have discovered that the above objects are achieved by first treating a derivative of DL-N-benzoyltyrosine of the formula

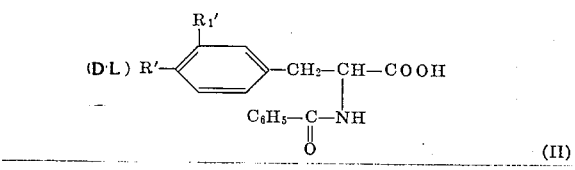

(II)

wherein
R' is hydrogen, hydroxyl or lower alkoxy, and
$R_1'$ is hydroxyl or lower alkoxy,
with aniline or a ring-substituted aniline in a buffered aqueous solution having a pH of about 5 to 7 and in the presence of a protease which is effective within this pH range to form a correspondingly substituted L-N-benzoyl-m-or p-tyrosyl-anilide, and subsequently hydrolyzing said tyrosyl-anilide with a mineral acid of suitable strength.

In the first step of the process according to the present invention, which proceeds to produce virtually quantitative yields of the intermediate L-N-benzoyl-tyrosylanilide, a protease which is effective within the pH range of 5–7 is employed. Suitable protease are especially vegetable protease, such as bromelain, ficin, papain or the like, or also microbial (bacterial or fungal) proteases.

The synthesis of the L-N-benzoyl-tyrosyl-anilide intermediate is carried out with a pH range of 5 to 7, preferably 5.6 to 6.2, the desired pH of the reaction mixture being adjusted with the aid of conventional buffers, such as citrate or phosphate buffer.

In place of aniline itself, ring-substituted derivatives thereof may also be used; the substituents may be lower alkyl, lower alkoxy, lower alkyl-mercapto, halo or sulfhydryl groups.

The D-form of the starting material may be recovered virtually quantitatively from the mother liquor and reconverted into the racemate by conventional methods.

In those instances where the substituents R' and $R_1'$ in the starting compound of the formula II already have the desired meanings of R and $R_1$, respectively, in the end product of the formula I, the subsequent hydrolysis of the intermediate is preferably effected with a dilute mineral acid at elevated temperatures, such as with aqueous 10% hydrochloric acid at reflux temperature. However, the hydrolysis of the intermediate tyrosyl-anilide may also be effected with a stronger acid, such as concentrated hydrobromic acid, especially when it is desired to simultaneously cleave ether linkages which may be present.

The following examples further illustrate the present invention and will enable other skilled in the art to understand it more completely. It should be understood, however, that the invention is not limited solely to the particular examples given below.

EXAMPLE 1

L-N-Benzoyl-3-methoxy-tyrosyl-anilide 31.5 gm( 0.1 mol) of DL-N-benzoyl-3-methoxy-tyrosine were dissolved in 200 ml of warm 0.05 N sodium hydroxide, the resulting solution was admixed with 150 ml of aqueous 2 M sodium acetate, and the mixture was filtered. The clear filtrate was admixed first with 300 ml of 0.1 N of cisteinium chloride and finally with 18 ml of freshly distilled aniline. The resulting mixture was combined with a solution of about 3 gm of papain in 300 ml of 0.05 N citrate buffer solution, and the pH of the mixed solution was adjusted to 5.80 by addition of either glacial acetic acid or 1 N sodium hydroxide, as needed. After a short time a precipitate began to form, and after about 48 hours of standing the reaction mixture was filtered, and the filter cake was washed with 300 ml of water, dried and recrystallized from methanol/water. A quantitative yield of L-N-benzoyl-3-methoxy-tyrosyl anilide, m. p. 280.0° – 208.5°C., was obtained

| Analysis: | $C_{23}H_{22}N_2O_4$; mol. wt. 390.45 |
|---|---|
| Calculated (%): | C, 70.75; H, 5.68; N, 7.18 |
| Found (%): | C, 70.58; H, 5.70; N, 7.00 |
| Specific rotation: | $[\alpha]_D^{20} = +40.0° \pm 0.15°$ (c = 1.000 in methanol). |

The mother liquor remaining after separation of the anilide was heated to 80°C., admixed with 100 ml of methanol, and the resulting solution was adjusted to pH 2.0 with concentrated hydrochloric acid. The acidic solution was then cooled, and the precipitate formed thereby was collected by vacuum filtration and dried, yielding D-N-benzoyl-3-methoxy-tyrosine which was racemized by conventional methods and used as the starting material for a subsequent run.

EXAMPLE 2

L-3-Hydroxy-tyrosine 9.75 gm (25 millimols) of L-N-benzoyl-3-methoxy-tyrosyl anilide were refluxed for seven hours with 50 ml of 48% hydrobromic acid. Thereafter, the reaction mixture was cooled, and the precipitated benzoic acid was separated by vacuum filtration and rinsed with a small amount of cold 48% hydrobromic acid. The slightly yellowish-brown filtrate was concentrated in vacuo and then evaporated to dryness; the residue was admixed with 50 ml of distilled water, and the mixture was again evaporated to dryness. The residue was dissolved in 50 ml of methanol, and the resulting solution was adjusted to pH 6.0 with concentrated ammonia, whereby a precipitate formed. The mixture was allowed to stand in a refrigerator overnight, was then vacuum-filtered, and the filter cake was dried at no higher than 50°C. The raw product thus obtained was dissolved in 180 ml of boiling water, the solution was filtered through charcoal, and the filtrate was first cooled to 20°C. in an atmosphere of nitrogen, then allowed to stand at this temperature until crystallization set in, and finally allowed to stand overnight in a refrigerator. The following day the mixture was vacuum-filtered, and the filter cake was dried at no higher than 50°C., yielding 3.4 gm (69.2% of theory) of L-3-hydroxy-tyrosine. The filtrate contained an additional 0.9 gm of the same product, making a total yield of 4.3 gm (87.4% of theory) of the compound of the formula (L) 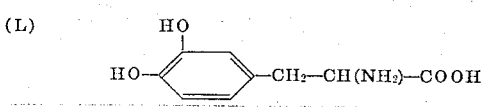

having a melting point of 290°C. (decomp.) and a specific rotation $[\alpha_D^{20} = -12.15° \pm 0.13°$ (c = 4.000 in 1 N hydrochloric acid.

The same result was obtained when bromelin or ficin was used as the protease in Example 1.

EXAMPLE 3

L-3-Methoxy-tyrosine

A mixture consisting of 9.75 gm (25 millimols) of L-N-benzoyl-3-methoxy-tyrosyl anilide and 100 ml of aqueous 10% hydrochloric acid was refluxed for 16 hours. Thereafter, the reaction solution was cooled and then extracted several times with ether, the etheral extracts being discarded. The aqueous phase was filtered through charcoal, the filtrate was evaporated to dryness in vacuo, the residue was taken up in acetone, and the resulting solution was adjusted to pH 6.0 with diethylamine and first allowed to stand at room temperature until crystallization began and then overnight in a refrigerator. Thereafter, the precipitate which had formed was collected by vacuum filtration, dried and recrystallized from water, yielding 4.1 gm (71.6% of theory) of the desired product. Drying of this product at 40°C. yielded L-3-methoxy-tyrosine monohydrate of the formula (L) 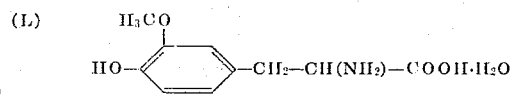

having a melting point of 241°-242°C. and a specific rotation $[\alpha]_D^{20} = -5.83°$ (c = 1.0 in 1 N HCl).

EXAMPLE 4

L-N-Benzoyl-L-N-Benxoyl-4-methoxy-m-tyrosyl anilide 31.5 gm (0.1 mol) of DL-N-benzoyl-4-methoxy-tyrosine were dissolved in 200 ml of warm 0.5 N sodium hydroxide, 150 ml of aqueous 2 M sodium acetate were added to the solution, and the mixture was filtered. While stirring, the clear filtrate was first admixed with 300 ml of 0.1 N citrate buffer solution (pH 5.0), and then 2 gm of cisteinium chloride and 18 ml of distilled aniline were added. Subsequently, a solution of about 3 gm of papain in 300 ml of 0.05 N citrate buffer solution was added, and the pH of the mixture was adjusted to 5.80 by addition of glacial acetic acid or 1 N sodium hydroxide, as needed. The reaction mixture was stirred at 35°C. for 48 hours, its pH being re-adjusted to 5.80 after about 8, 24 and 32 hours by addition of glacial acetic acid. After 48 hours the reaction mixture was vacuum-filtered, and the filter cake was thoroughly washed with water, dried and recrystallized from aqueous methanol, yielding 90–95% of theory of L-N-benzoyl-4-methoxy-m-tyrosyl anilide having a melting point of 161°-162°C. and a specific rotation $[\alpha]_D^{20} = +43.6°$ (c = 1.000 in methanol).

The filtrate was heated to 80°C. and admixed with 200 ml of methanol, and concentrated hydrochloric acid was added to the mixture until it has a pH of 2.0. Thereafter, the acidic solution was cooled, vacuum-filtered, and the filter cake was dried, yielding D-N-benzoyl-4-methoxy-m-tyrosine which was racemized in conventional manner and used as the starting material for a subsequent run.

EXAMPLE 5

L-N-Benzoyl-m-tyrosyl anilide 28.5 gm (0.1 mol) of DL-N-benzoyl-m-tyrosine were dissolved in 200 ml of warm 0.5 N sodium hydroxide, the solution was admixed with 150 ml of aqueous 2 M sodium acetate, and the mixture was filtered. While stirring, the clear filtrate was first admixed with 300 ml of 0.1 N citrate buffer solution (pH 5.0), and then 2 gm of cisteinium chloride and 18 ml of distilled aniline were added. Subsequently, a solution of about 3 gm of papain in 300 ml of 0.05 N citrate buffer solution was added, and the pH of the mixture was adjusted to 5.80 by addition of glacial acetic acid or 1N sodium hydroxide, as needed. The reaction mixture was stirred at 35°C. for 48 hours, its pH being re-adjusted to 5.80 after about 8, 24 and 32 hours by addition of glacial acetic acid. After 48 hours the reaction mixture was vacuum-filtered, and the filter cake was thoroughly washed with water, dried and recrystallized from aqueous methanol, yielding 80–90% of theory of L-N-benzoyl-m-tyrosyl anilide having a melting point of 218°–219°C. and a specific rotation $[\alpha]_c^{20} = +44.0°$ (c = 0.50 in methanol).

The filtrate was heated to 80°C. and admixed with 200 ml of methanol, and concentrated hydrochloric acid was added to the mixture until it had a pH of 2.0. Thereafter, the acidic solution was cooled, vacuum-filtered, and the filter cake was dried, yielding D-N-benzoyl-m-tyrosine which was racemized in conventional manner and used as the starting material for a subsequent run.

EXAMPLE 6

L-N-Benzoyl-O-methyl-m-tyrosyl anilide 31.5 gm (0.1 mol) of DL-N-benzoyl-O-methyl tyrosine were dissolved in 200 ml of warm 0.5 N sodium hydroxide, 150 ml of aqueous 2 M sodium acetate were added to the solution, and the mixture was filtered. While stirring, the clear filtrate was first admixed with 300 ml of 0.1 N citrate buffer solution (pH 5.0), and then 2 gm of cisteinium chloride and 18 ml of distilled aniline were added. Subsequently, a solution of about 3 gm of papain in 300 ml of 0.05 N citrate buffer solution was added, and the pH of the mixture was adjusted to 5.80 by addition of glacial acetic acid or 1 N sodium hydroxide, as needed. The reaction mixture was stirred at 35°C. for 48 hours, its pH being re-adjusted to 5.80 after about 8, 24 and 32 hours by addition of glacial acetic acid. After 48 hours the reaction mixture was vacuum-filtered, and the filter cake was thoroughly washed with water, dried and recrystallized from aqueous methanol, yielding 90–95% of theory of L-N-benzoyl-O-methyl-m-tyrosyl anilide having a melting point of 178°–179°C. and a specific rotation $[\alpha]_D^{20} = +41.8°$ (c = 0.5 in methanol).

The filtrate was heated to 80°C. and admixed with 200 ml of methanol, and concentrated hydrochloric acid was added to the mixture until it has a pH of 2.0. Thereafter, the acidic solution was cooled, vacuum-filtered, and the filter cake was dried, yielding D-N-benzoyl-O-methyl-m-tyrosine which was racemized in conventional manner and used as the starting material for a subsequent run.

EXAMPLE 7

L-4-Hydroxy-m-tyrosine (L-dopa)

9.75 gm (25 millimols) of L-N-benzoyl-4-methoxy-m-tyrosyl anilide were refluxed for 7 hours with 50 ml of 48% hydrobromic acid. Thereafter, the reaction mixture was cooled, the precipitated benzoic acid was separated by vacuum filtration, and the filter cake was rinsed with a small amount of cold 48% hydrobromic acid. The slightly yellowish filtrate was evaporated to dryness in vacuo, the residue was dissolved in 50 ml of methanol, the solution was admixed with 5 ml of propyleneoxide, and the mixture was allowed to stand first at 50°C. for about one hour until it had a pH of 6.0 and then in a refrigerator overnight. Thereafter, the reaction mixture was vacuum-filtered, and the filter cake was recrystallized from water under exclusion of air. The filtrate was cooled and allowed to stand first at room temperature until crystallization began and then overnight in a refrigerator. The following day the precipitate was collected by vacuum filtration and dried at no higher than 50°C., yielding 3.4 gm (69.0% of theory) of L-dopa, m. p. 290°C. (decomp.), specific rotation $[\alpha]_D^{20} = -12.15°$ (c = 4.000 in 1 N HCl).

The end product was identical to L-3-hydroxy-tyrosine obtained in Example 2.

EXAMPLE 8

L-4-Methoxy-m-tyrosine

A mixture consisting of 9.75 gm of L-N-benzoyl-4-methoxy-m-tyrosyl anilide and 100 ml of 2N hydrochloric acid was refluxed for 24 hours. Thereafter, the reaction mixture was cooled, extracted three times with methylene chloride, the aqueous phase was filtered through charcoal, and the filtrate was evaporated to dryness in vacuo. The residue was dissolved in 50 ml of ethanol, 5 ml of propyleneoxide were added to the solution, and the mixture was allowed to stand at 50°C. for about one hour until it had a pH of 6.0. Subsequently, the mixture was allowed to stand overnight in a refrigerator, was then vacuum-filtered, and the filter cake was recrystallized from water. The aqueous solution was allowed to stand overnight in a refrigerator and was then vacuum-filtered, and the filter cake was dried at no more than 70°C. in a drying chamber with circulating air. 61% of theory of L-4-methoxy-m-tyrosine monohydrate, m. p. 251°–253°C., specific rotation $[\alpha]_D^{20} = -8.5°$ (c = 2.000 in 1N HCl), was obtained.

EXAMPLE 9

L-m-Tyrosine

A mixture consisting of 9.0 gm of L-N-benzoyl-m-tyrosyl anilide and 100 ml of aqueous hydrochloric acid (1:1) was refluxed for seven hours. Thereafter, the reaction mixture was cooled, diluted with water and extracted three times with methylene chloride. The aqueous phase was filtered through charcoal, the filtrate was evaporated to dryness to vacuo, and the residue was dissolved in 50 ml of methanol. About 5 ml of propyleneoxide were added to the solution, and the mixture was kept at 50°C. for about one hour until it had a pH of 6.0. Subsequently, the mixture was allowed to stand overnight in a refrigerator, was then vacuum-filtered, and the filter cake was recrystallized from water. 80% of theory of L-m-tyrosine, m. p. 296°–298°C. (decomp.), specific rotation $[\alpha]_D^{20} = -9.2°$ (c = 2.000 in 1N HCl), was obtained.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. The process for the preparation of a derivative of L-tyrosine of the formula (L)
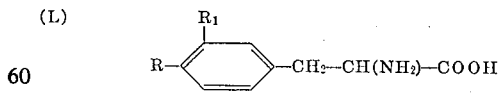

wherein R
 is hydrogen, hydroxyl or lower alkoxy, and
 $R_1$ is hydroxyl or lower alkoxy,
provided, however, that at least one of R and $R_1$ is hydroxyl, which consists essentially of treating a derivative of DL-N-benzoyl-tyrosine of the formula (D L)

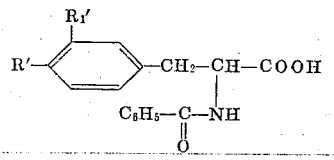

wherein
R' is hydrogen, hydroxyl or lower alkoxy, and
R₁' is hydroxyl or lower alkoxy, with aniline or a ring-substituted aniline in a buffered aqueous solution having a pH of 5.6 to 6.2 and in the presence of a protease which is effective within this pH range to precipitate a correspondingly substituted L-N-benzoyl-m- or p-tyrosyl-anilide, separating said L-tyrosyl-anilide and hydrolyzing it with a mineral acid of suitable strength.

2. The process of claim 1, wherein said protease is a vegetable protease.

3. The process according to claim 2, wherein said vegetable protease is bromelin, ficin or papain.

* * * * *